April 18, 1967 H. L. BURNS ET AL 3,314,280
METHOD AND MEANS FOR INDICATING THE CONCENTRATION
OF A GAS IN A MIXTURE OF GASES
Filed Aug. 26, 1963
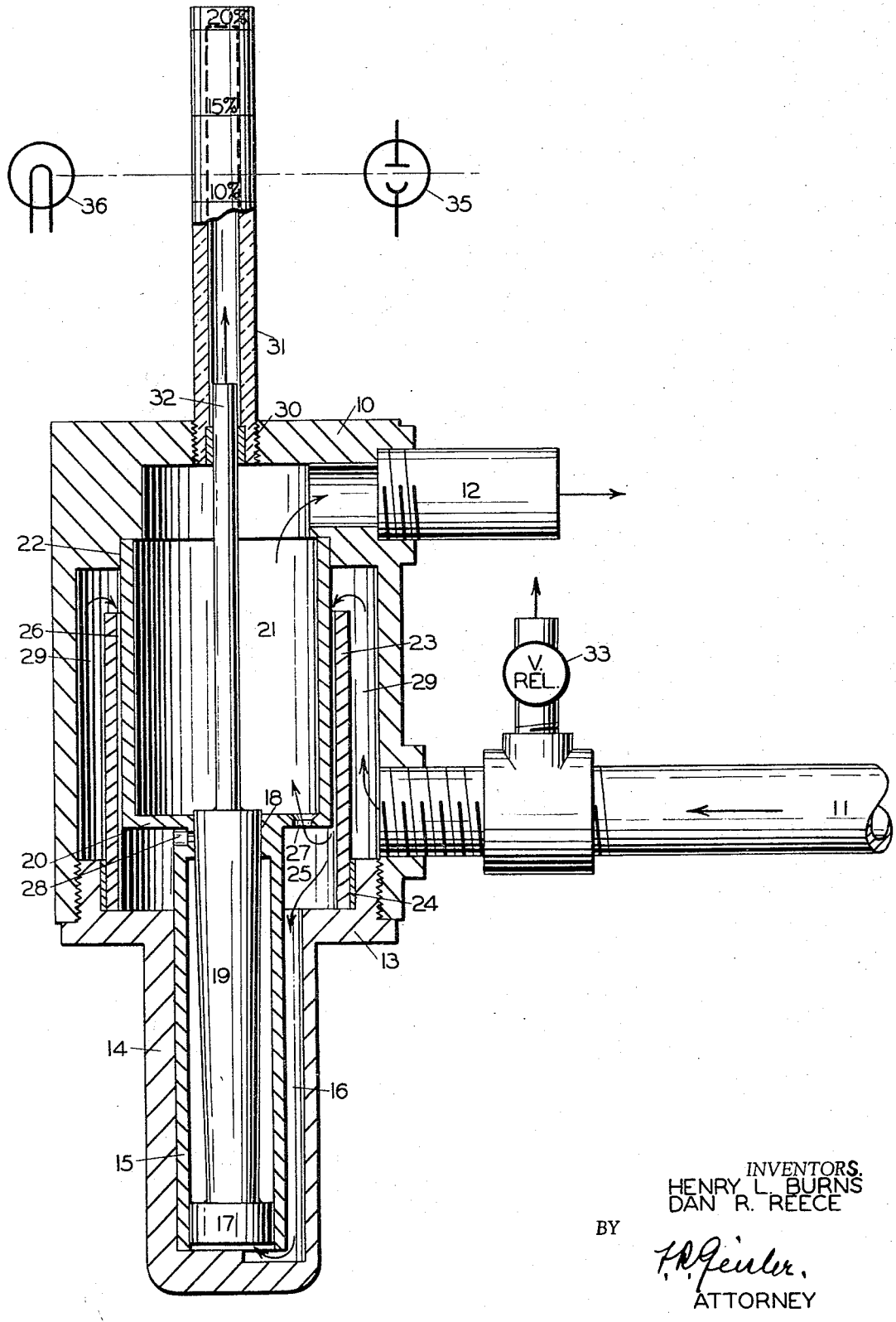
INVENTORS.
HENRY L. BURNS
DAN R. REECE
BY
ATTORNEY United States Patent Office 3,314,280
Patented Apr. 18, 1967

3,314,280
METHOD AND MEANS FOR INDICATING THE CONCENTRATION OF A GAS IN A MIXTURE OF GASES
Henry L. Burns, Beaverton, Oreg., and Dan R. Reece, 10111 SW. 57th Ave., Portland, Oreg. 97219; said Burns assignor to said Reece
Filed Aug. 26, 1963, Ser. No. 304,513
5 Claims. (Cl. 73—23)

This invention relates in general to methods and devices for indicating the concentration of a gas in a mixture of gases and particularly to methods and devices for checking, indicating and controlling the quantity of carbon dioxide in a maintained stream of air. As is well-known, it is desirable and necessary in various fields, for example, with biological tissue culture, with fresh fruit storage, and in the control of atmosphere for breathing, to maintain a check on the amount of carbon dioxide in the air.

The instruments currently available for analyzing the presence of carbon dioxide in the air are, for the most part, complicated and expensive and require careful maintenance. With these the presence of variable amounts of water vapor as humidity in the air, and variations in the temperature of the air, could cause considerable error in the carbon dioxide indication and consequently these devices require moisture analysis or removal and special temperature control.

An object of the present invention is to provide an improved device for indicating the concentration of a gas in a mixture of gases which will be of simplified construction and easy maintenance.

A further specific object of the invention is to provide a novel carbon dioxide indicator and control which will not require moisture analysis or removal.

An additional object is to provide a carbon dioxide indicator which will not require maintenance of a constant temperature of the air being tested.

Still another object of the invention is to provide a new and improved method for determining the concentration of a gas in a mixture of one or more gases.

In accordance with the method of the present invention a flow path for gases is provided including a pair of orifices of different flow characteristics and which may be, by way of example, a laminar flow orifice and a turbulent flow orifice. A sample of gas of known composition is passed through said such path and thereafter a sample of unknown composition passed through said path and the flow characteristics of the samples in said path are measured, as for example, by determining the pressure drops at various points in such path. The flow characteristics of the gas of unknown composition are then related to those of the gas of known composition and by previous calibration the unknown composition can be determined.

In a particular embodiment of the present invention the physical properties of viscosity and density of carbon dioxide and of water vapor in combination with those of air, are utilized in a novel manner and through the intermediary of a novel and relatively simple device in which compensation for temperature changes is also provided.

The manner in which the above objects and incidental advantages are attained, and the construction and operation of a device employed for carrying out the invention will be briefly explained and described with reference to the accompanying drawing.

In the accompanying drawing, which is more or less diagrammatic and which shows a sectional elevation of the described device, a main housing assembly includes a substantially cylindrical upper main portion 10, a delivery pipe 11 for the air to be tested and a discharge outlet pipe 12. A lower main housing portion 13 is attached to and forms the closure for the bottom of the upper housing portion 10. The housing portions are rigidly secured together in suitable manner and the connections are provided with suitable sealing means to prevent any gas leakages at such connections.

The lower housing portion 13 has a bottom chamber 14 in which a cylinder 15 is firmly mounted. The bottom end of the cylinder 15 is open and a segment of the wall of the housing chamber 14 is of reduced thickness so as to provide a passageway 16 leading to the bottom end of the cylinder 15. A piston 17 is mounted in the cylinder 15.

The cylinder 15 extends upwardly beyond the chamber 14 and lower housing 13 and the head of the cylinder 15 is formed into a valve seat 18 for the upper and larger diameter end of a tapered plug 19. The piston 17 is secured to the bottom end of this tapered plug 19. The head of the cylinder 15 is extended laterally to form the bottom wall 20 of an upper cylinder 21 and this upper cylinder 21 has an integral cylindrical wall, the top end of which fits into a shouldered recess 22 in the upper interior of the housing portion 10. This cylinder 21 is open at the top and the air and gas passing into the cylinder 21 are discharged freely through the outlet pipe 12.

An outer cylindrical wall 23 surrounds the wall of the cylinder 21 and is spaced slightly therefrom. This outer cylindrical wall 23 terminates at the top below the junction of the cylinder 21 with the housing 10. The spacing between the wall of the cylinder 21 and the surrounding wall 23 forms a restricted annular orifice or passageway 26. The bottom end of the cylinder wall 23 fits into a shouldered recess 24 in the top of the lower housing portion 13. Thus an annular chamber 25 is provided below the cylinder 21 into which the restricted annular passageway 26, formed between the cylinder 21 and the surrounding cylindrical wall 23, leads and from which the passageway 16 leads down to the bottom of the cylinder 15 and to the underside of the piston 17.

A restricted turbulent flow orifice 27, provided in the bottom wall 20 of the cylinder 21, allows air and gas to pass from the annular chamber 25 into the open cylinder 21. A turbulent flow orifice 28 in the head of the lower cylinder 15 also leads from the annular chamber 25 into the upper cylinder 21 whenever the plug 19 is raised from its seat in the head of cylinder 15, and, since the plug 19 is tapered, having a downwardly decreasing diameter, the orifice 28 is a variable one whereas the orifice 27 is fixed.

An annular chamber or passageway 29 is provided within the housing 10 around the outer cylindrical wall 23, and the air being tested, delivered through the delivery pipe 11, passes into this annular chamber 29 from whence it must pass first through the restricted annular passageway 26 in its course through the device.

The top wall of the housing 10 is formed with an opening 30, in axial alignment with the cylinders 21 and 15, in which opening the open bottom end of a cylinder 31 is secured. This cylinder 31 is made of glass or, more preferably, of transparent plastic. An indicator rod 32, mounted in the plug 19, extends up into this transparent cylinder 31 and is slidable in a suitable bearing seal. The transparent cylinder 31 carries calibrated scale mounting.

The construction of the device as described allows the wall of the upper cylinder 21 and the surrounding cylindrical wall 23 conveniently to be formed of different metals and enables the outer cylindrical wall 23 to be fabricated from a high thermal expansion metal and the inner cylindrical wall of the cylinder 21 to be fabricated from a relatively low thermal expansion metal. For example, satisfactory results have been obtained by fabricating the outer cylindrical wall 23 of aluminum and having the wall of cylinder 21 formed of stainless steel. The reason for having these two walls preferably formed in this manner from metals of different thermal expansion characteristics will be presently apparent.

The manner in which this device is employed in the carrying out of the invention will now be explained. The air sample being tested is supplied through pipe 11 by a suitable gas sampling pump (not shown) capable of providing a gas flow of a predetermined rate at predetermined pressure, for example a flow of 1 cubic foot per minute at 10 inches water column pressure. It is necessary that a constant flow pressure be maintained while the test is being carried out and thus that a constant pressure in the outer chamber 29 of the main body of the device be maintained during the test, and for this purpose a pressure regulator valve 33 is mounted on the delivery pipe 11 adjacent its discharging end so that if any excess pressure or back pressure should develop in the delivery line such excess pressure would immediately be relieved. The stream of air to be tested, delivered into the chamber 29, is required to pass down through the restricted annular passageway 26 and thence to the annular distribution chamber 25. The dimensions of the restricted annular passageway 26 are such that the gas flow is laminar and approximately one-half of the pressure in the gas will be absorbed as it passes down through this restricted passageway. The orifices 26 and 27 are of such diameter that in the absence of any carbon dioxide concentration in the air, the air reaching the chamber 25 will all pass out through the fixed orifice 27 and be exhausted through the discharge outlet 12 without producing any movement of the piston 17 in the cylinder 15.

Now for the moment disregarding temperature and moisture factors in the stream of air being tested, let it be assumed that the air contains an increased concentration of the carbon dioxide. Since carbon dioxide is known to have greater density and lower viscosity than air, the decreased viscosity of the carbon dioxide-air mixture will cause an increase in the flow through the restricted passageway 26. This increased flow will cause an increase in the gas delivered into the distribution chamber 25, causing pressure to build up there. The fixed orifice 27 now would be unable to take care of all the gas received into the chamber 25 and this fact plus the extra resistance caused by the higher density of the mixture in chamber 25 will cause a build up in pressure in chamber 25 to take place which acts on the pressure sensing piston 17 causing the tapered plug 19 and indicator rod 32 to be moved upwardly. At the same time the upward movement of the plug 19 would open the variable orifice 28 allowing gas to flow therethrough from the chamber 25 until a new balance is reached which would be indicated by the raised position of the top of the indicator rod 32 which would show on the calibrated scale of the cylinder 31.

Next let it be assumed that, while the proportion of carbon dioxide in the air continues the same as described in the previous paragraph, the temperature of the air being tested rises. It is known that an increase in temperature causes decrease in gas density and increase in gas viscosity. This temperature rise would slow the flow through the restricted passageway 26 if the size of this passageway remained constant. However, due to the fact that the outer cylindrical wall 23 is made of metal of higher thermal expansion than the opposed wall of cylinder 21, the temperature rise will produce a slight increase in the width of the passageway 26 and this will compensate sufficiently for the slower gas flow to maintain the same pressure in distribution chamber 25 and thus to maintain the resulting reading on the calibrated scale of cylinder 31. While the increase in temperature, by decreasing the gas density, would have some slight effect in increasing the flow rate through the turbulent orifices 27 and 28, the previously described thermal expansion differential of the cylindrical walls forming the restricted passageway 26, and the dimensions of the same are such that they over-compensate for loss of viscous flow capacity in an amount sufficient also to compensate for the density flow capacity increase.

The flow of air and gas through the restricted passageway 26, which would be a laminar flow as distinguished from a turbulent flow, may be expressed by the following formula:

$$\text{Pressure drop} = \frac{A \text{ (viscosity) (velocity)}}{\text{(width of passageway)}^3}$$

where A is a constant

Similarly the flow through the orifices 27 and 28, which would be a turbulent flow, may be expressed by the following formula:

$$\text{Pressure drop} = B \text{(density) (velocity)}^2$$

where B is a constant

Referring now to the effects which water vapor in the air will have on the test being made for the carbon dioxide concentration, it is known that water vapor has less density and lower viscosity than air. Thus an increase in water vapor in the air, by decreasing the viscosity, will increase the flow rate through the restricted passageway 26. However, the water vapor decreases the density and consequently will increase the flow rate through the orifices 27 and 28, preventing a tendency to build up the pressure in the distribution chamber 25 to cause corresponding change in the position of the indicator rod 32. The net result is that water vapor, or change in the humidity of the air, will not influence the desired test for the carbon dioxide concentration due to the manner in which the physical properties of viscosity and density of water vapor and of air are taken into account in the carrying out of the invention by the device described.

It will be noted that this device, in contrast to other devices used for similar purposes, has much fewer moving parts (there being only two actual moving parts), and that, due to the simplicity of construction and operation, no particular maintenance problem is involved. A feature of the particular construction is the fact that it provides a large displacement stroke of the indicator 32 with very small change in the opening of the variable orifice 28.

The calibrated scale on the transparent tube 31 enables the test results to be easily observed. In the event an automatic regulation and limitation of the carbon dioxide in the controlled atmosphere is desired this can be accomplished by the installation, for example, of a photo-electric cell positioned in some selected location, as indicated at 35, at which point the focused ray from a lamp 36 will be cut off by the rod when the rod rises to a predetermined height in the tube 31. Such photo-electric cell would be connected with means (not shown) which would cause a relatively greater amount of pure air or oxygen to be delivered into the controlled atmosphere for reducing the carbon dioxide concentration, for example.

The important feature in the particular device described is the provision for a laminar flow orifice in combination with a turbulent flow orifice for the gas being tested in its passage through the device.

Various minor modifications would be possible in the device illustrated without departing from the principle of the invention.

We claim:

1. In a device for testing carbon dioxide concentration in air in which a sample of the air to be tested is delivered into the device in a flow of predetermined rate at a constant predetermined pressure, an air-receiving chamber, a second air distribution chamber in the device, a flow-restricting passageway connecting said second chamber with said first mentioned chamber so arranged as to cause laminar flow of the air from said first chamber to said second chamber, said second chamber having an open fixed discharging orifice connecting said second chamber with an outlet from said device and providing turbulent flow by-pass from said second chamber, said second chamber having a second turbulent orifice connected with said outlet from said device by a variable passageway, means responsive to the air pressure within said second chamber controlling the opening through said last mentioned variable passageway, and indicating means operated by said pressure responsive means.

2. In a device of the character described for testing carbon dioxide concentration in air in which a sample of the air to be tested is delivered into the device in a flow of predetermined rate at a constant predetermined pressure, an air-receiving chamber, a second air distribution chamber in the device, a thin flow-restricting passageway connecting said second chamber with said first mentioned chamber and so arranged as to cause laminar flow of the air from said first chamber to said second chamber, said passageway constructed of materials of different thermal expansion properties so arranged that the gap between opposed walls of said passageway will change proportionate to a change in temperature of the air passing through said device whereby the pressure drop of said passage will remain substantially constant, variable outlet means in said second chamber so arranged as to provide turbulent outflow from said second chamber, and outlet means leading to an outlet from said device, means responsive to the pressure in said second chamber producing variation in said variable outlet means, and indicating means operated by said pressure responsive means.

3. In a device of the character described for testing carbon dioxide concentration in air in which sample of the air to be tested is delivered into the device in a flow of predetermined rate at a constant predetermined pressure, an air-receiving chamber, a second air distribution chamber in the device, a thin flow-restricting passageway connecting said second chamber with said first mentioned chamber and so arranged as to cause laminar flow of the air from said first chamber to said second chamber, said passageway constructed of materials of different thermal expansion properties so arranged that the gap between opposed walls of said passageway will change proportionate to a change in temperature of the air passing through said device whereby the pressure drop of said passageway will remain substantially constant, said second chamber having an open fixed discharging orifice connecting said second chamber with an outlet from said device and providing a turbulent flow by-pass from said second chamber, said second chamber having a second turbulent flow orifice connected with said outlet from said device by a variable passageway, means responsive to the air pressure within said second chamber controlling the opening through said last mentioned variable passageway, and indicating means operated by said pressure responsive means.

4. In a device for testing carbon dioxide concentration in air in which a sample of the air to be tested is delivered into the device in a flow of predetermined rate at a constant predetermined pressure, an air-receiving chamber, a second air distribution chamber in the device, a flow-restricting passageway connecting said second chamber with said first mentioned chamber and so arranged as a cause laminar flow of the air from said first chamber to said second chamber, said second chamber having an open fixed discharging orifice connecting said second chamber with an outlet from said device and providing a turbulent flow by-pass from said second chamber, said second chamber having a second turbulent flow orifice connected with said outlet from said device by a variable passageway, a tapered plug closing said last mentioned passageway when said plug is in lowered position but opening said last mentioned passageway to a gradually increasing extent as said plug is lifted, an air cylinder, a passageway leading from said second chamber to the bottom of said cylinder, a piston in said cylinder, said plug extending down into said cylinder and the bottom end of said plug connected to said piston, whereby the raising and lowering of said piston and plug will be governed by the pressure in said second chamber, and an indicator element operated by said plug.

5. A device for testing carbon dioxide concentration in the air including means for delivering a sample of the air to be tested into the device in a flow of predetermined rate at a constant predetermined pressure during the testing period, an annular air-receiving chamber, a second annular air distribution chamber located below said first chamber in the device, a flow restricting annular passageway connecting said second chamber with said first mentioned chamber causing laminar flow of the air from said first chamber to said second chamber, said passageway extending between a pair of concentric annular walls, the outer of said pair of walls being constructed of a material of higher thermal expansion than the inner of said walls, whereby the gap between said walls will increase when the temperature of the air passing through said device rises, said second chamber having an open fixed discharging orifice connecting said second chamber with an outlet from said device and providing a turbulent flow by-pass from said second chamber, said second chamber having a second turbulent flow orifice connected with said outlet from said device by a variable passageway, a tapered plug closing said last mentioned passageway when said plug is in lowered position but opening said last mentioned passageway to a gradually increasing extent as said plug is lifted, an air cylinder, a passageway leading from said second chamber to the bottom of said cylinder, a piston in said cylinder, said plug extending down into said cylinder and the bottom of said plug connected to said piston, whereby the raising and lowering of said piston and plug will be governed by the pressure in said second chamber, and an indicator element operated by said plug.

References Cited by the Examiner
UNITED STATES PATENTS

| | | | |
|---|---|---|---|
| 1,633,352 | 6/1927 | Tate | 73—23 |
| 1,884,896 | 10/1932 | Smith | 73—23 |
| 1,922,939 | 8/1933 | Fagelston | 73—23 |
| 2,310,435 | 2/1943 | Jenkins | 73—23 X |
| 2,434,008 | 1/1948 | Osborn | 138—44 |
| 2,449,067 | 9/1948 | Guillemin | 73—23 |
| 3,086,386 | 4/1963 | Kapff | 73—23 |

RICHARD C. QUEISSER, *Primary Examiner.*

J. FISHER, *Assistant Examiner.*